US007640826B2

(12) United States Patent
Weldon et al.

(10) Patent No.: US 7,640,826 B2
(45) Date of Patent: Jan. 5, 2010

(54) ACTUATOR APPARATUS INCORPORATING A CONTROLLER

(75) Inventors: Craig Andrew Weldon, Ontario (CA); Frank Wiemer, Ontario (CA); Edward Kunath, Detroit, MI (US); Jacob Ritchie, Ontario (CA)

(73) Assignee: Continental Automotive Canada, Inc., Chatham, Ontario (CA)

( * ) Notice: Subject to any disclaimer, the term of this patent is extended or adjusted under 35 U.S.C. 154(b) by 639 days.

(21) Appl. No.: 10/969,322

(22) Filed: Oct. 21, 2004

(65) Prior Publication Data

US 2006/0086201 A1 Apr. 27, 2006

(51) Int. Cl.
*G05G 1/30* (2008.04)
*H02K 11/00* (2006.01)

(52) U.S. Cl. .............................. 74/512; 74/513; 74/560; 310/71

(58) Field of Classification Search ........... 74/512–514, 74/560; 310/68 R, 71, 89, 239, 68 B; 439/76.1; 192/99 S
See application file for complete search history.

(56) References Cited

U.S. PATENT DOCUMENTS

| | | | | |
|---|---|---|---|---|
| 3,293,462 | A * | 12/1966 | Wright | 310/68 R |
| 4,470,570 | A | 9/1984 | Sakurai et al. | |
| 5,010,782 | A | 4/1991 | Asano et al. | |
| 5,056,742 | A | 10/1991 | Sakurai | |
| 5,063,811 | A | 11/1991 | Smith | |
| 5,241,936 | A | 9/1993 | Byler | |
| 5,385,068 | A | 1/1995 | White et al. | |
| 5,460,061 | A | 10/1995 | Redding et al. | |
| 5,632,183 | A | 5/1997 | Rixon et al. | |
| 5,722,302 | A * | 3/1998 | Rixon et al. | 74/512 |
| 5,819,593 | A | 10/1998 | Rixon et al. | |
| 5,964,125 | A * | 10/1999 | Rixon et al. | 74/514 |
| 6,099,324 | A * | 8/2000 | Janssen et al. | 439/76.1 |
| 6,109,241 | A | 8/2000 | Engelgau | |
| 6,151,976 | A | 11/2000 | Inoue | |
| 6,237,565 | B1 | 5/2001 | Engelgau | |
| 6,249,068 | B1 * | 6/2001 | Knopp | 310/71 |
| 6,698,309 | B2 | 3/2004 | Rixon et al. | 74/512 |
| 6,759,783 | B2 * | 7/2004 | Hager et al. | 310/239 |
| 6,766,713 | B2 * | 7/2004 | Sundaresan et al. | 74/512 |
| 6,799,487 | B2 | 10/2004 | Garland et al. | 74/512 |
| 6,810,765 | B2 * | 11/2004 | Zhang et al. | 74/512 |
| 6,906,438 | B2 * | 6/2005 | Ursel et al. | 310/89 |
| 6,925,904 | B2 * | 8/2005 | Sundaesan et al. | 74/512 |
| 7,270,028 | B2 * | 9/2007 | Rixon et al. | 74/512 |
| 7,328,781 | B2 * | 2/2008 | Song | 192/99 S |
| 2003/0121354 | A1 | 7/2003 | Rixon et al. | |
| 2003/0121355 | A1 | 7/2003 | Rixon et al. | |
| 2004/0244527 | A1 * | 12/2004 | Rixon et al. | 74/560 |

* cited by examiner

*Primary Examiner*—Vinh T. Luong

(57) ABSTRACT

An adjustable positioning apparatus, which may be used for a foot-operated control, includes a first member that is movably supported with respect to a base, an adjuster that is supported on the first member, and a second member. The adjuster includes a displacement device, an actuator, and a controller. The displacement device includes a first portion that is coupled to the first member, and includes a second portion that is displaced with respect to the first portion. The actuator displaces the second portion with respect to the first portion, and the controller operates the actuator and determines displacement of the second portion with respect to the first portion. The second member is coupled to the second portion.

6 Claims, 6 Drawing Sheets

ACTUATOR APPARATUS INCORPORATING A CONTROLLER

FIELD OF THE INVENTION

An actuator for an adjustable pedal is used in an automotive vehicle to vary the operating position of a foot pedal that controls a vehicle system, such as the engine throttle, brake system or clutch.

BACKGROUND OF THE INVENTION

A known adjustable pedal uses an electrical motor to rotate a drive cable that, in turn, rotates a worm gear to adjust the position of a pedal. Other known actuators eliminate the cable and connect the worm gear more directly to a pedal lever. These known systems are believed to suffer from a number of disadvantages, which include large numbers of parts, excessive noise and imprecise output. Another disadvantage of these know assemblies is believed to be the large size requirements within the tight confines of the driver's footwell.

SUMMARY OF THE INVENTION

The present invention provides an adjustable positioning apparatus that includes a first member that is movably supported with respect to a base, an adjuster that is supported on the first member, and a second member. The adjuster includes a displacement device, an actuator, and a controller. The displacement device includes a first portion that is coupled to the first member, and includes a second portion that is displaced with respect to the first portion. The actuator displaces the second portion with respect to the first portion, and the controller operates the actuator and determines displacement of the second portion with respect to the first portion. The second member is coupled to the second portion.

The present invention also provides an apparatus for adjustably positioning a foot-operated control with respect to a vehicle chassis. The apparatus includes a lever, which is pivotally supported on the vehicle chassis, an adjuster that is supported on the lever, and a pedal. The adjuster includes a threaded rod, a nut, an electric motor, a body, and a controller. The nut cooperatively engages the threaded rod. The threaded rod is supported for relative rotation with respect to the lever arm, and the nut is displaced upon rotation of the threaded rod. The electric motor rotates the threaded rod and includes a plurality of coils. The housing includes a body portion and a coupling portion. The electric motor is disposed in the body portion, which is fixed with respect to the lever. The controller is disposed in the coupling portion and includes a motor driver and a processor. The motor driver provides a drive signal to the plurality of coils, and the processor determines displacement of the nut with respect to the threaded rod based on a feedback signal generated in the plurality of coils during operation of the electric motor. The pedal is fixed to the nut.

The present invention also provides an actuator including a threaded rod, a nut, an electric motor, a housing that includes a body portion and a coupling portion, and a controller. The threaded rod extends along an axis. The nut cooperatively engages the threaded rod and is displaced along the axis upon rotation of the threaded rod. The electric motor, which is disposed in the body portion of the housing, rotates the threaded rod and includes a plurality of coils. The controller is disposed in the coupling portion and includes a motor driver and a processor. The motor driver provides a drive signal to the plurality of coils, and the processor determines displacement of the nut with respect to the threaded rod based on a feedback signal generated in the plurality of coils during operation of the electric motor.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention. Like numerals indicate like or corresponding parts throughout the several views.

DETAILED DESCRIPTION OF THE PREFERRED EMBODIMENT

Figure 1:
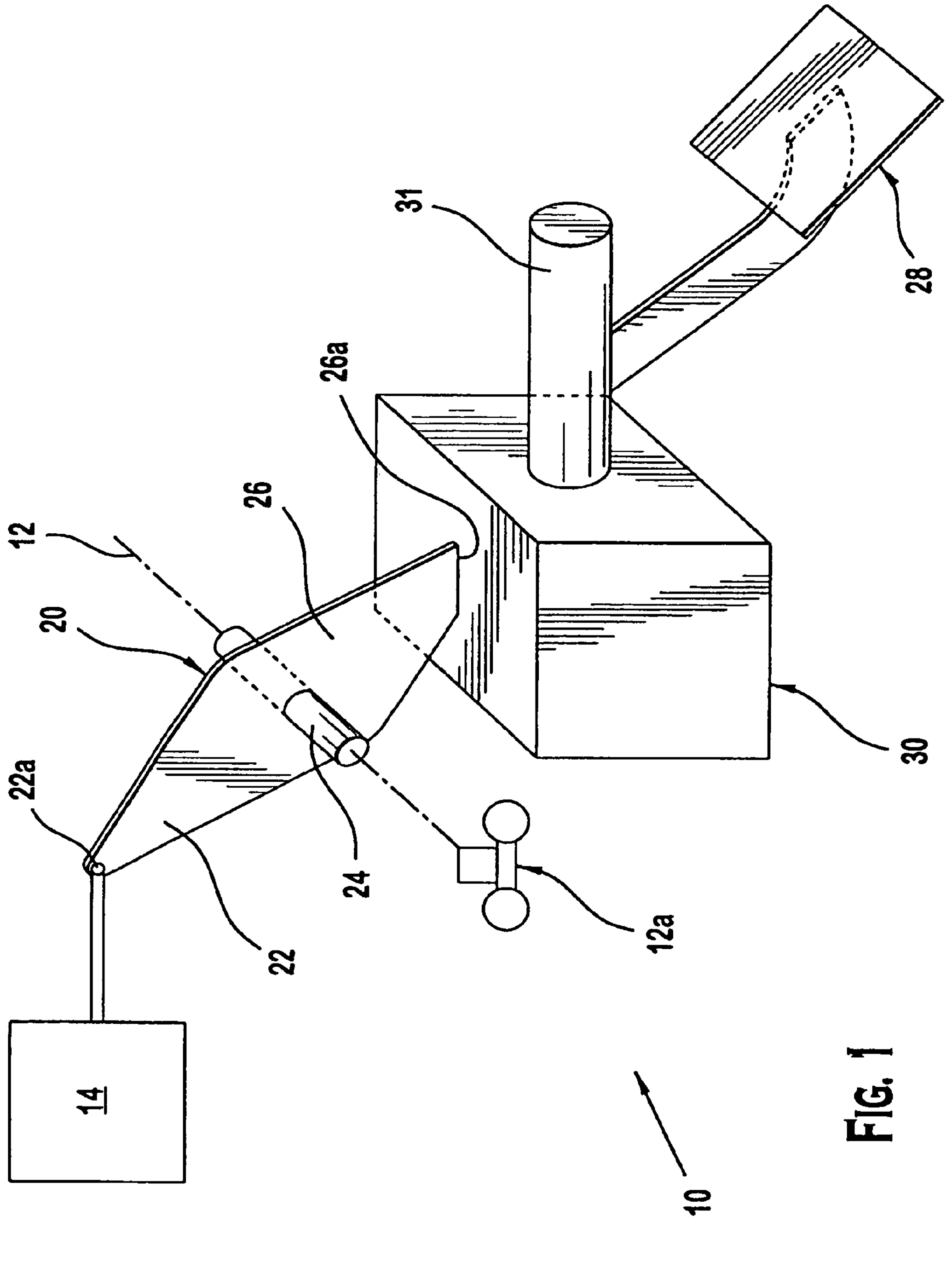
FIG. 1 is schematic view of an adjustable pedal according to a preferred embodiment.
Figure 2:
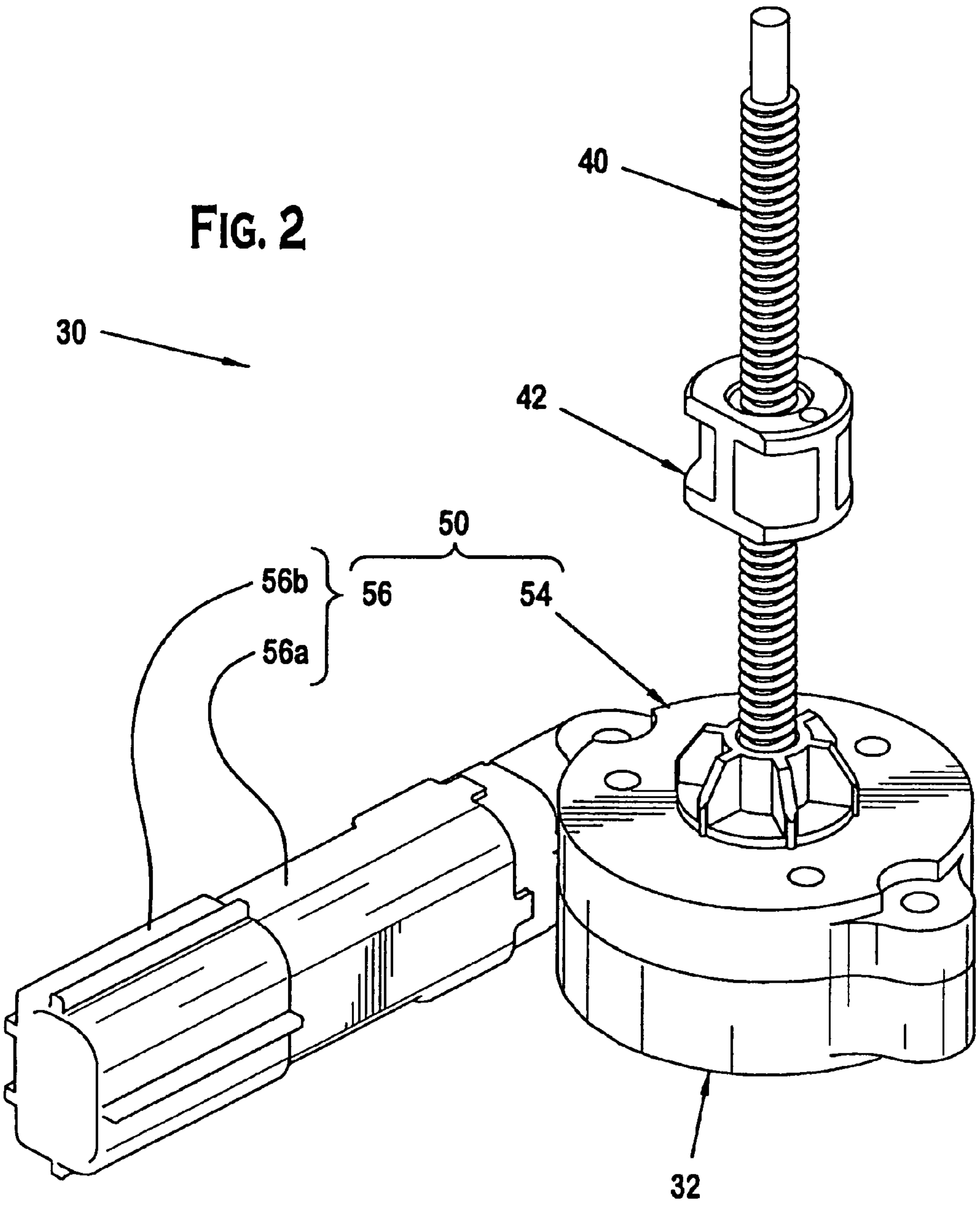
FIG. 2 is a isometric view of a preferred embodiment of an adjustable positioning apparatus according to a preferred embodiment.
Figure 3:
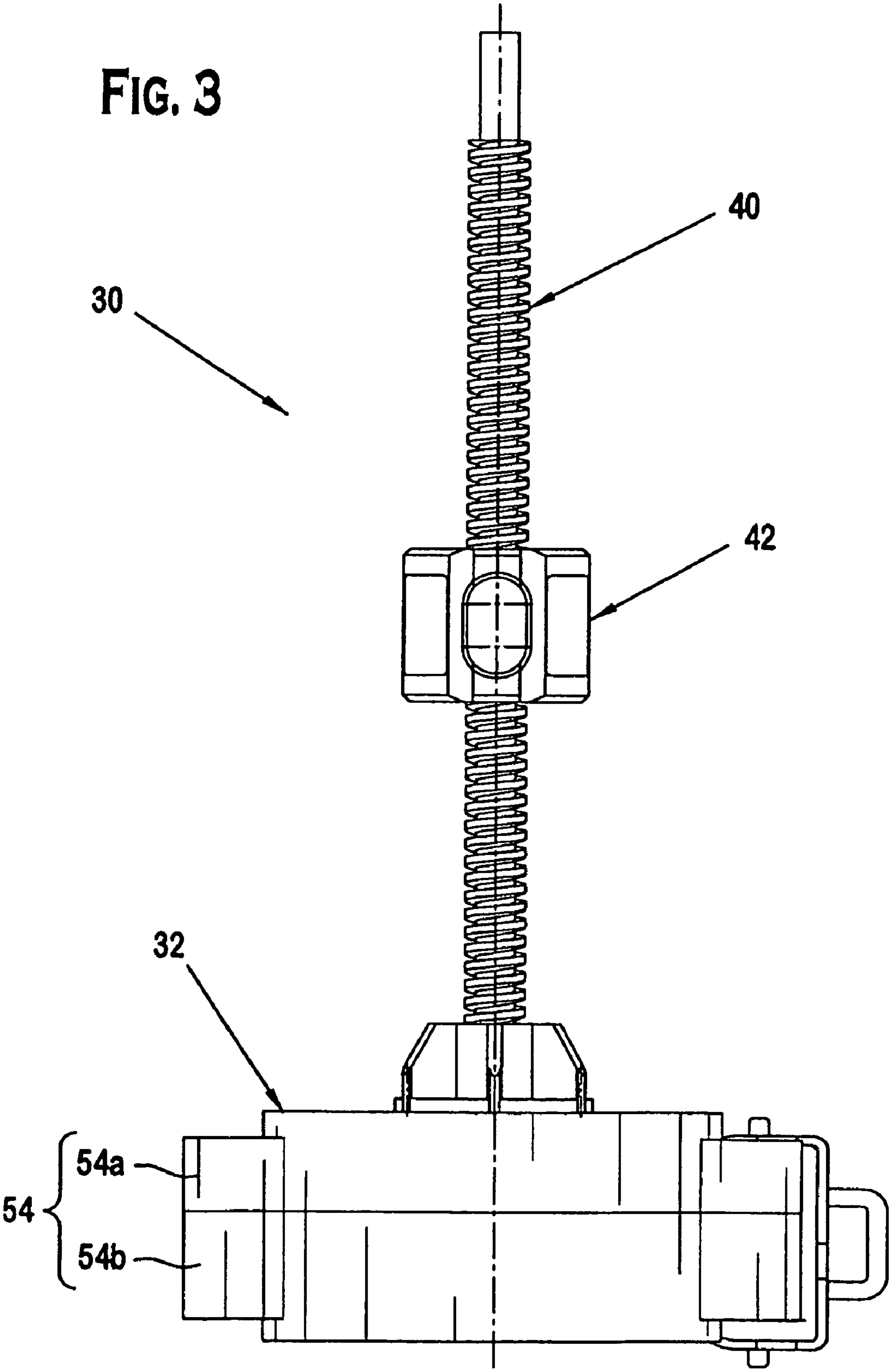
FIG. 3 is an axial longitudinal view of the preferred embodiment of the adjustable positioning apparatus shown in FIG. 2.
Figure 4:
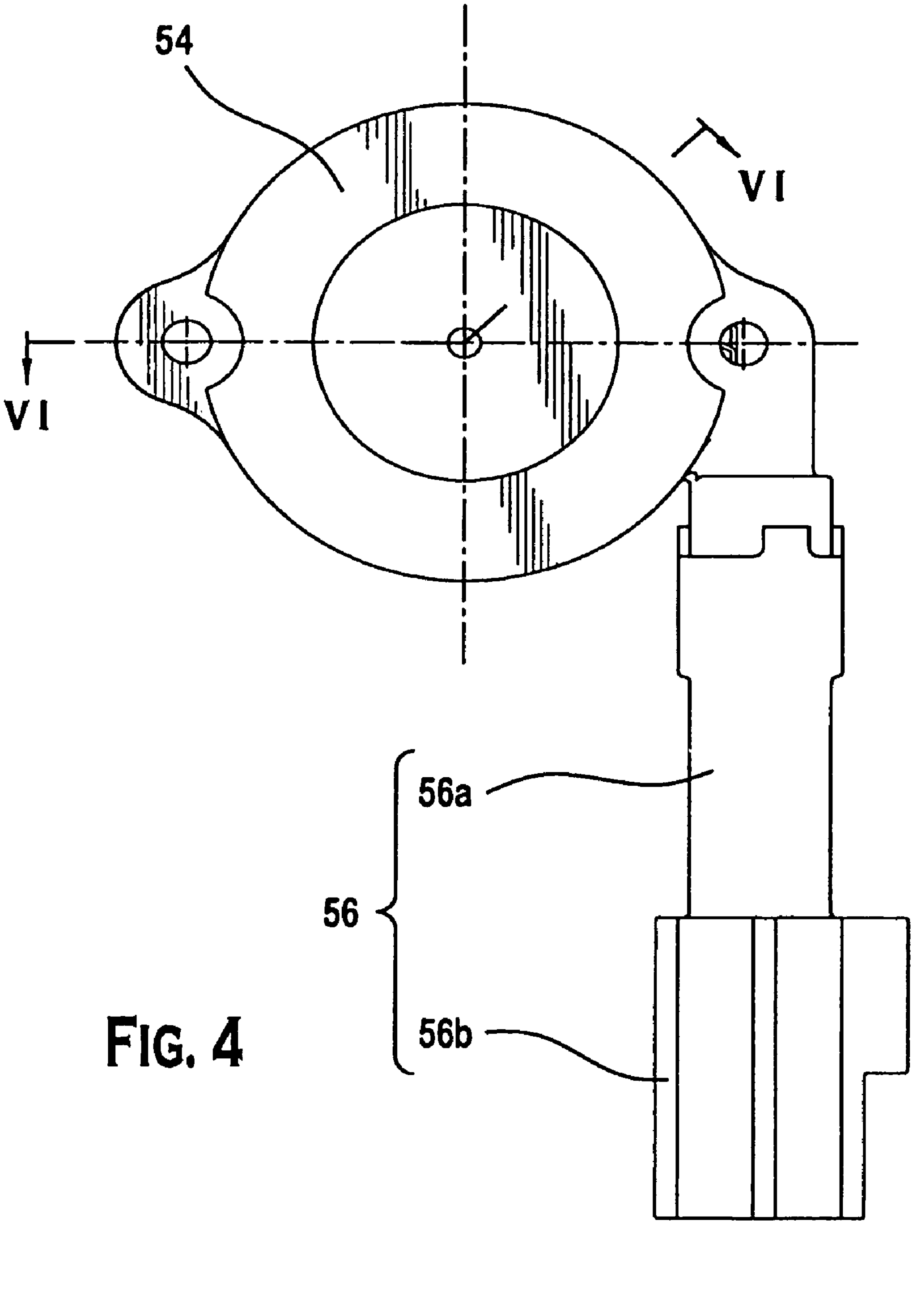
FIG. 4 is a axial end view of the preferred embodiment of the adjustable positioning apparatus shown in FIG. 2.
Figure 5:
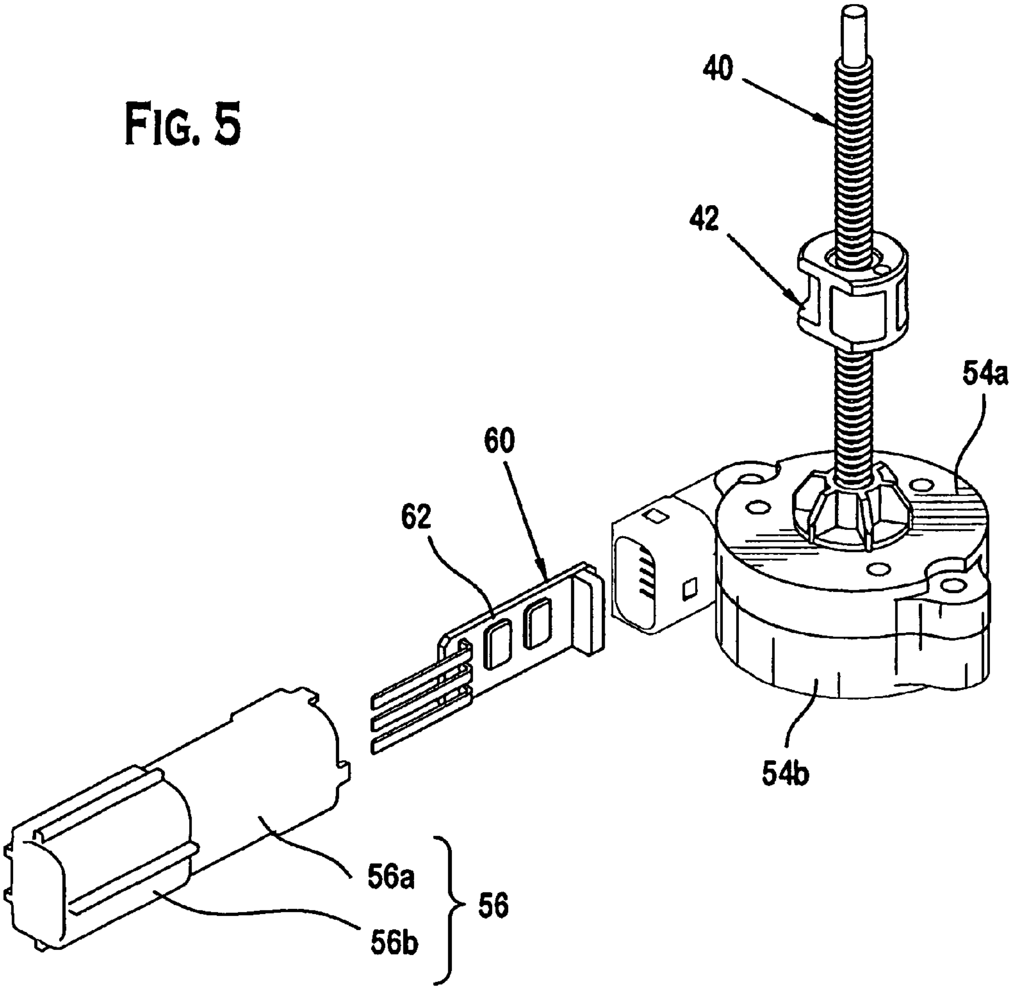
FIG. 5 is an exploded isometric view of the preferred embodiment of the adjustable positioning apparatus shown in FIG. 2.

Referring initially to FIG. 1, an adjustable pedal is generally shown at 10. The adjustable pedal 10 pivots about an axis 12 with respect to a base, e.g., a vehicle chassis, which is schematically indicated at 12*a*. The adjustable pedal 10 may be operatively associated with a vehicle system 14 such as an engine throttle control system, a brake system or a clutch.

A pedal lever 20 is pivotally supported for rotation about the pivot axis 12 with respect to the vehicle chassis 12*a*. In particular, the pedal lever 20 includes a first lever arm 22 that extends from a pivot 24 to a first lever arm end 22*a* operatively connected to the vehicle system 14. And a second lever arm 26 extends from the pivot 24 to a second lever arm end 26*a*. Coupled with the second lever arm end 26*a* is a pedal 28 that is engaged by a foot to operate the pedal lever 20.

Interconnecting a first member, e.g., the pedal lever 20, and a second member, e.g., the pedal 28, is an actuator 30 that displaces the pedal 28 relative to the pedal lever 20. The actuator 30 may include a drive source, such as an electric motor, and may include a linkage, such as a rotary to linear motion converter. Relative displacement is directed by a guide 31, which may be tubular with a longitudinal slot. U.S. Pat. Nos. 5,722,302 and 5,964,125 and 6,698,309, which show a drive source and a linkage for an adjustable pedal, are hereby incorporated by reference it their entireties.

Referring now to FIGS. 2-6, there is shown a preferred embodiment of an actuator 30 including an electrically operated motor 32 providing a rotary drive source. The electric motor 32 may sequential move in discrete angular increments, e.g., a stepper motor, or may move in a continuous manner, e.g., a brushless motor. Preferably, the motor 32 rotates a threaded rod 40, which results in linear displacement of a nut 42 that is cooperatively engaged with the threaded rod 40. Alternatively, the motor 32 could rotate a nut causing linear displacement of a cooperatively engaged threaded rod. Further, other types of rotary to linear motion converters, e.g., rack and pinion gearing or worm gearing, could be used to displace a pedal 28 with respect to a lever 20.

Figure 6:
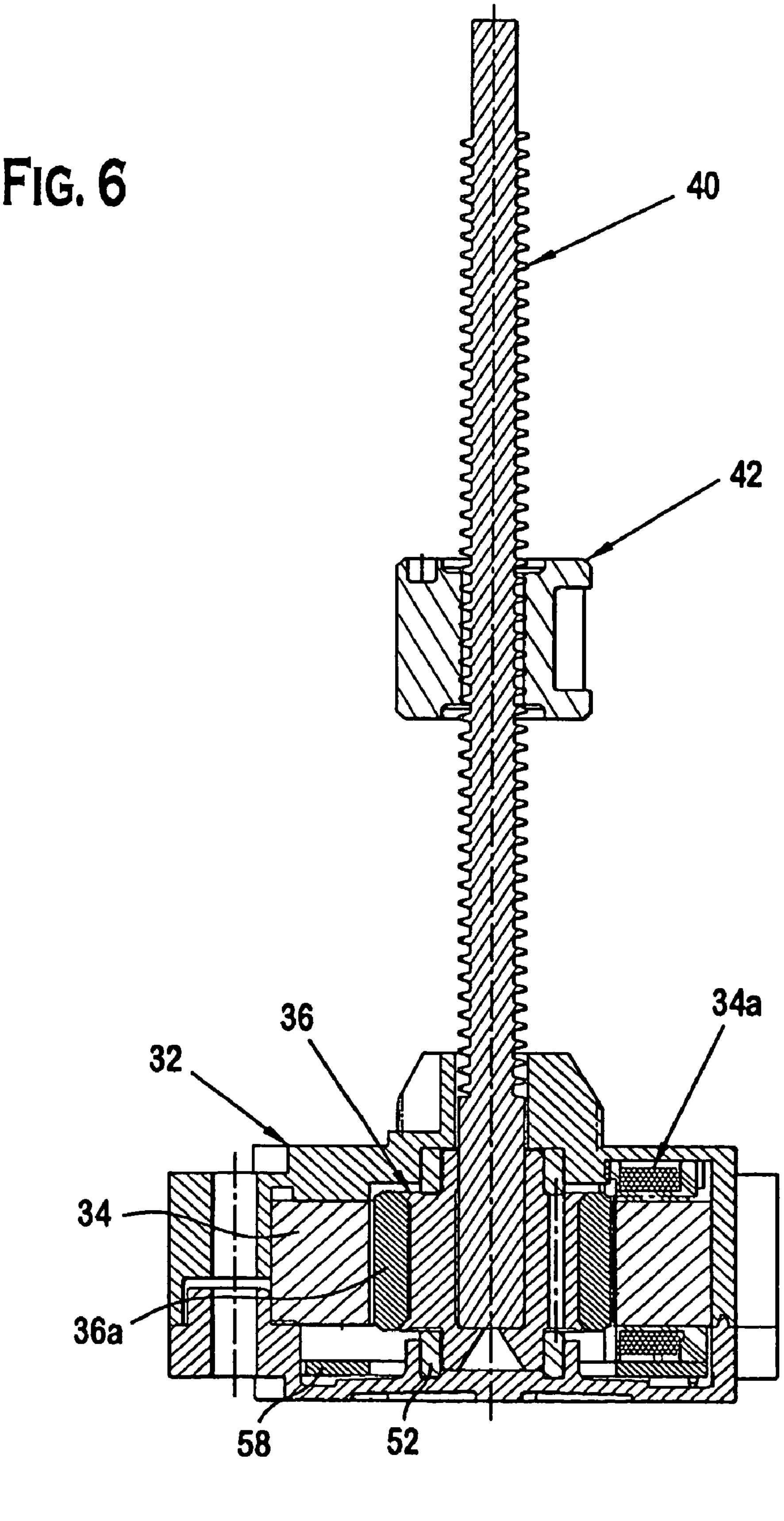
FIG. 6 is a cross-section taken along line VI-VI in FIG. 4.

The motor 32 is preferably constructed with a stator 34 that has a plurality of windings or coils 34*a* (e.g., one of three is shown in FIG. 6) that are angularly spaced around the axis of rotation (e.g., 120 degrees), and an armature 36 that includes a permanent magnet 36*a*. As is well understood, sequentially energizing and de-energizing each of the coils 34*a* set up individual magnetic fields that either attract or repulse the permanent magnet 36*a*, thereby causing the armature 36 to rotate. At the same time, rotation of the permanent magnet 36*a* induces in the coils 34*a* a current that can be used to determine angular movement, e.g., number of rotations of the armature 34. The phenomenon that creates this current is commonly referred to as back electromotive force, or back emf.

The motor 32 is disposed in a housing 50 that preferably supports the threaded rod 40 for relative rotation. Antifriction devices such as a bearing 52 may be used at the interface of the threaded rod 40 and the housing 50. The housing 50 preferably includes a body portion 54, in which the motor 32 is disposed, and a coupling portion 56, by which the electrical connections are made with the motor 32. In order to facilitate assembly of the actuator 30, at least the body portion 54 of the housing 50 may be assembled from more than one piece. As particularly shown in FIG. 3, the body portion 54 may preferably be divided into a front piece 54*a* and a back piece 54*b*. An insert molded lead frame 58 may be disposed in the bottom of the back piece to make the electrical connections with the coils 34*a*.

The coupling portion 56 of the housing 50 preferably includes an enclosure portion 56*a* for a controller 60, and an interchangeable electrical connector portion 56*b*, which is preferably detachable with respect to the enclosure portion 56*a*. The interchangeable electrical connector portion 56*b* facilitates providing various configurations of electrical contacts to matingly engage different styles of plug connectors. It is envisioned that the body portion 54 and the enclosure portion 56*a* would be universally used, and a particular interchangeable electrical connector portion 56*b* would be selected according to the particular specification of the manufacturer for the vehicle chassis 12*a*.

The controller 60 that is disposed in the enclosure portion 56*a* of the coupling portion 56 preferably includes an application-specific integrated circuit (ASIC) 62 that can perform at least two functions: 1) driving the coils 34*a*, and 2) determining displacement of the pedal 28 with respect to the vehicle chassis 12*a*. The first function is commonly referred to as a motor drive circuit. And the second function is performed by a processor based on the number of rotations of the armature 34, which is determined using back emf, as discussed previously, and the stored knowledge of the thread pitch of the threaded rod 40. The controller 60 preferably also includes a memory for different operational positions of the pedal 28, such as for the preferences of different operators of the vehicle.

In the event of a loss of the current operational position of the pedal, e.g., due to the motor 32 stalling, the controller 60 detects the stall and adjusts the pedal lever position or shuts down the actuator 30 so as to maintain the existing relationship between the pedal lever 20 and the pedal 28. When the controller 60 detects stall of the motor 32, e.g., based on unusual voltage and time characteristics exhibited by the drive circuit, the controller 60 may use an included software program to reset the adjustable pedal 10 by displacing the petal 22 to its extreme positions, as detected by the motor 32 stalling.

In operation, a device for adjusting the position of the pedal 28 can be effected by a switch, e.g., a rocker switch, that is manually actuated by the operator of the vehicle, or can be effected by a body controller unit which may interrelate a number of ergonomic and safety adjustments. For example, in the case of a vehicle equipped with a system of airbags, the body control unit may adjust the seat and pedal positions so that an occupant is a prescribed distance from the airbags.

An adjustable petal system 10 that uses a body control unit may require as few as three electrical contacts for each actuator 30: a power contact, a ground contact, and a communication contact. The power and ground contacts supply the power required by the motor 32, and the communication contact may be connected via a digital serial communication link to the body control unit. In the case of a manual switch, two additional contacts may be required to connect the actuator 30 with the wire from the increase spacing pole of the switch and with the wire from the decrease spacing pole of the switch.

Incorporating a controller 60 that is mounted directly on the actuator 30 provides the present invention with a number of advantages. First, the present invention eliminates a separate controller that is additionally mounted on the chassis and then additionally connected to the actuator 30. Second, by virtue of having self-contained processing power, the present invention eliminates the need to draw processing capacity from other preexisting processors, e.g., engine control unit. Third, by virtue of the controller 60 processing the back emf signals from the coils 34*a*, the present invention eliminates the need for additional motor rotation sensors, e.g., an array of Hall effect sensors, which add cost, complexity and size. Fourth, by virtue of the controller 60 processing the back emf signals from the coils 34*a*, the present invention eliminates at least four wires from the wiring harnesses connecting the actuator 30. Fifth, the interchangeable electrical connector portion 56*b* of the present invention facilitates the universal applicability of the actuator 30 while providing an easy manner of adapting to varying styles of electrical plug connectors.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. An actuator comprising:

a threaded rod extending along an axis;

a nut cooperatively engaging threads of the threaded rod, the nut being displaced along the axis upon rotation of the threaded rod;

an electric motor rotating the threaded rod, the electric motor including a plurality of coils;

a housing including a body portion and a coupling portion coupled directly to the body portion, the electric motor being disposed in the body portion; and a controller being disposed in the coupling portion and including a motor driver and a processor, the motor driver providing a drive signal to the plurality of coils, and the processor determining displacement of the nut with respect to the threaded rod based on a feedback signal generated in the plurality of coils during operation of the electric motor, wherein the controller is electrically connected directly to the electric motor via an electrical connector portion with electrical contacts mating directly with plug connectors, the electrical connector portion being constructed and arranged to be interchangeable with another electrical connector portion for mating with a different style of plug connectors, and wherein the feedback signal comprises a back electromotive force generated signal.

2. The actuator according to claim 1, wherein the electric motor comprises a brushless motor.

3. The actuator according to claim 2, wherein the plurality of coils comprises at least three separate windings equiangularly disposed around the axis.

4. The actuator according to claim 1, wherein the housing comprises a lead frame disposed in the body portion, and the lead frame includes pairs of leads supplying electrical energy to respective ones of the plurality of coils.

5. The actuator according to claim 1, wherein the controller comprises an application-specific integrated circuit.

6. The actuator according to claim 5, wherein the application-specific integrated circuit comprises the motor driver and the processor.

* * * * *